(12) United States Patent
Roehrl et al.

(10) Patent No.: US 9,469,351 B2
(45) Date of Patent: Oct. 18, 2016

(54) STRUCTURE FOR A MOTOR VEHICLE, IN PARTICULAR A PASSENGER VEHICLE, AS WELL AS A METHOD FOR PRODUCING SUCH A STRUCTURE

(71) Applicant: Bayerische Motoren Werke Aktiengesellschaft, Munich (DE)

(72) Inventors: Sabine Roehrl, Germering (DE); Thomas Weiss, Feldafing (DE); Ferdinand Dirschmid, Ottobrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 142 days.

(21) Appl. No.: 14/309,595

(22) Filed: Jun. 19, 2014

(65) Prior Publication Data
US 2014/0300135 A1    Oct. 9, 2014

Related U.S. Application Data (63) Continuation of application No. PCT/EP2012/073643, filed on Nov. 26, 2012.

(30) Foreign Application Priority Data

Dec. 20, 2011 (DE) .......... 10 2011 089 153

(51) Int. Cl.
*B62D 25/14* (2006.01)
*B62D 25/20* (2006.01)
(Continued)

(52) U.S. Cl.
CPC ......... *B62D 25/2036* (2013.01); *B62D 21/152* (2013.01); *B62D 25/082* (2013.01); *B62D 25/2045* (2013.01); *B62D 29/005* (2013.01); *Y10T 156/10* (2015.01)

(58) Field of Classification Search
CPC B62D 21/152; B62D 25/081; B62D 25/082; B62D 25/085; B62D 25/088; B62D 25/14; B62D 25/2018; B62D 25/2036; B62D 25/2045; B62D 29/005; Y10T 156/10
See application file for complete search history.

(56) References Cited

U.S. PATENT DOCUMENTS 4,078,840 A * 3/1978 Itoh ...................... B62D 25/081
                                                  296/192
4,466,653 A * 8/1984 Harasaki ............... B62D 25/08
                                                  280/784

(Continued)

FOREIGN PATENT DOCUMENTS

CN     101186222 A    5/2008
CN     102248967 A    11/2011

(Continued)

OTHER PUBLICATIONS

International Search Report (PCT/ISA/210) dated Feb. 5, 2013 with English translation (seven pages).

(Continued)

*Primary Examiner* — Glenn Dayoan
*Assistant Examiner* — Paul Chenevert
(74) *Attorney, Agent, or Firm* — Crowell & Moring LLP (57) ABSTRACT

A structure for a motor vehicle, particularly a passenger car, includes a front wall delimiting a passenger cabin toward the front, which extends between lateral vehicle pillars of the structure, and a carrier element which extends in transverse direction of the vehicle. The carrier element is supported by a front side of the front wall and at least to some extent overlaps the lateral vehicle pillars.

18 Claims, 4 Drawing Sheets (51) Int. Cl.
  *B62D 21/15* (2006.01)
  *B62D 25/08* (2006.01)
  *B62D 29/00* (2006.01)

(56) References Cited

U.S. PATENT DOCUMENTS

| | | | | |
|---|---|---|---|---|
| 5,112,102 A * | 5/1992 | Wurl | ................... | B62D 23/00 280/785 |
| 5,411,311 A * | 5/1995 | Shimmell | ............ | B62D 25/082 280/798 |
| 5,580,122 A * | 12/1996 | Muehlhausen | ........ | B62D 65/04 296/192 |
| 5,882,065 A * | 3/1999 | Koiwa | ................. | B62D 25/082 296/187.09 |
| 6,095,592 A * | 8/2000 | Nakatani | ............. | B62D 21/152 296/187.09 |
| 6,145,923 A * | 11/2000 | Masuda | ............... | B62D 25/082 296/1.03 |
| 6,250,710 B1 * | 6/2001 | Matsuzaki | ........... | B62D 25/081 296/187.09 |
| 6,260,914 B1 * | 7/2001 | Nieminski | ............. | B62D 25/14 280/779 |
| 6,270,152 B1 * | 8/2001 | Sato | ....................... | B62D 21/11 296/192 |
| 6,312,028 B1 * | 11/2001 | Wilkosz | .................. | B60R 19/18 188/377 |
| 6,416,119 B1 * | 7/2002 | Gericke | ................. | B62D 21/12 29/897.2 |
| 6,666,501 B1 * | 12/2003 | Logan | ................... | B62D 21/10 296/193.07 |
| 6,688,676 B1 * | 2/2004 | Sato | ..................... | B62D 21/152 296/187.05 |
| 6,695,374 B1 * | 2/2004 | Gebreselassie | ....... | B60R 13/083 180/90 |
| 6,755,461 B2 * | 6/2004 | Seksaria | ................ | B60K 5/12 296/193.04 |
| 6,817,657 B2 * | 11/2004 | Watanabe | ............ | B62D 25/081 180/90 |
| 6,830,289 B2 * | 12/2004 | Miyabayashi | ........ | B62D 25/082 296/193.07 |
| 7,374,233 B2 * | 5/2008 | Li | ............................ | B60S 1/50 296/193.09 |
| 7,404,596 B2 * | 7/2008 | Miyata | ................. | B62D 25/088 296/203.02 |
| 7,546,893 B2 * | 6/2009 | Rahmstorf | ........... | B62D 25/081 180/68.3 |
| 7,770,964 B2 | 8/2010 | Herntier et al. | | |
| 7,798,562 B2 | 9/2010 | Wrobel et al. | | |
| 7,845,716 B2 * | 12/2010 | Kiyotake | ............. | B62D 21/152 296/203.02 |
| 8,029,046 B2 * | 10/2011 | Yamada | ............. | B62D 25/2018 296/187.09 |
| 8,220,864 B2 * | 7/2012 | Mildner | ................. | B62D 25/14 296/187.09 |
| 8,449,024 B2 | 5/2013 | Pietroni | | |
| 8,894,129 B2 * | 11/2014 | Katou | ................. | B62D 21/155 296/187.03 |
| 2010/0320712 A1 | 12/2010 | Leanza et al. | | |
| 2011/0193332 A1 * | 8/2011 | Mildner | ............... | B62D 25/082 280/781 |
| 2013/0292969 A1 * | 11/2013 | Metzner | ............... | B62D 21/152 296/187.09 |

FOREIGN PATENT DOCUMENTS

| | | | | |
|---|---|---|---|---|
| DE | 26 28 104 A1 | 1/1977 | | |
| DE | 4116832 A1 * | 11/1992 | ........... | B62D 25/081 |
| DE | 102 60 048 A1 | 7/2004 | | |
| DE | 10 2005 011 975 A1 | 9/2006 | | |
| DE | 102005033030 A1 * | 1/2007 | ........... | B62D 25/081 |
| DE | 10 2006 055 721 A1 | 5/2008 | | |
| DE | 10 2006 055 730 A1 | 5/2008 | | |
| DE | 60 2005 003 588 T2 | 10/2008 | | |
| DE | 102008050279 A1 * | 5/2009 | ........... | B62D 25/145 |
| DE | 10 2008 049 762 A1 | 4/2010 | | |
| DE | 10 2008 062 007 A1 | 6/2010 | | |
| DE | 102008062007 A1 * | 6/2010 | ............. | B62D 25/08 |
| DE | 10 2010 052 277 A1 | 7/2011 | | |
| DE | 10 2010 022 158 A1 | 11/2011 | | |
| DE | 102010021137 A1 * | 11/2011 | .............. | B62D 25/06 |
| DE | 102011088688 A1 * | 6/2013 | .............. | B62D 25/14 |
| DE | 102011089158 A1 * | 6/2013 | .............. | B62D 29/005 |
| DE | 102012012746 A1 * | 1/2014 | .............. | B62D 25/14 |
| EP | 1 183 177 B1 | 4/2004 | | |
| FR | EP 0327415 A1 * | 8/1989 | ........... | B62D 25/081 |
| FR | 3014401 A1 * | 6/2015 | .............. | B62D 25/00 |
| JP | 3435910 B2 * | 8/2003 | ......... | B62D 25/2018 |
| JP | 2005-206107 A | 8/2005 | | |
| JP | WO 2013153872 A1 * | 10/2013 | .............. | B62D 21/12 |
| JP | WO 2015050032 A1 * | 4/2015 | .............. | B62D 25/08 |
| WO | WO 99/15238 A1 | 4/1999 | | |
| WO | WO 2010017254 A2 * | 2/2010 | .............. | B29C 70/025 |

OTHER PUBLICATIONS

German Search Report dated Aug. 2, 2012 with partial English translation (10 pages).

Chinese Office Action issued in counterpart Chinese Application No. 201280063206.8 dated Aug. 21, 2015, with English translation (sixteen (16) pages).

* cited by examiner

STRUCTURE FOR A MOTOR VEHICLE, IN PARTICULAR A PASSENGER VEHICLE, AS WELL AS A METHOD FOR PRODUCING SUCH A STRUCTURE

CROSS REFERENCE TO RELATED APPLICATIONS

This application is a continuation of PCT International Application No. PCT/EP2012/073643, filed Nov. 26, 2012, which claims priority under 35 U.S.C. §119 from German Patent Application No. 10 2011 089 153.6, filed Dec. 20, 2011, the entire disclosures of which are herein expressly incorporated by reference.

BACKGROUND AND SUMMARY OF THE INVENTION

The invention relates to a structure for a motor vehicle, particularly a passenger car, having a front wall delimiting a passenger cabin toward the front, which front wall extends between lateral vehicle pillars of the structure, and to a method for producing such a structure.

Structures of the above-mentioned type are sufficiently known from the series production of passenger cars. Such a structure comprises a front wall which delimits a passenger cabin of a motor vehicle toward the front in a longitudinal direction of the vehicle. The front wall extends in a transverse direction of the vehicle between lateral vehicle pillars of the structure.

Such a structure is also known from DE 10 2006 055 721 A1. That structure also includes a central tunnel and a front wall cross member having two side parts attached to the lateral vehicle pillars, and a middle part connecting the two side parts. The side parts of the front wall cross member are formed such that they bear at least to some extent against the front wall and are also connected to the front wall. The middle part bears at least to some extent against the central tunnel and is disposed at a distance from the front wall. The front wall cross member is arranged in a longitudinal direction of the vehicle behind the front wall and is overlapped toward the front by the front wall. Experience has shown that such a structure, in case of accident-related application of force to the motor vehicle, has an accident behavior in need of improvement.

Therefore, the problem addressed by the present invention is that of further developing a structure for a motor vehicle, particularly a passenger car, and a method for producing a structure of the initially described type such that the structure exhibits an improved accident behavior.

This problem is solved with a structure for a motor vehicle, and a method of producing same, particularly a passenger car, having a front wall delimiting a passenger cabin toward the front, which front wall extends between lateral vehicle pillars of the structure. A carrier element, which extends in a transverse direction of the vehicle, is supported by a front side of the front wall and at least to some extent overlaps the lateral vehicle pillars.

Such a structure for a motor vehicle, particularly a passenger car, comprises a front wall which delimits a passenger cabin of a motor vehicle toward the front in a longitudinal direction of the vehicle. The front wall extends in a transverse direction of the vehicle between lateral vehicle pillars of the structure.

According to the invention, a carrier element is provided which, relative to the longitudinal direction of the vehicle, is supported by a front side of the front wall, extends in the transverse direction of the vehicle, and at least to some extent overlaps the lateral vehicle pillars toward the front. The carrier element is thus a support member for supporting or absorbing, and advantageously diverting, accident-related loads, particularly in case of a frontal impact collision of the motor vehicle. The front wall and thus the passenger cabin (cell) can be protected from unwanted damage in case of an accident-related application of force to the motor vehicle, particularly in case of a frontal impact collision, and unwanted intrusions into the passenger cabin can be prevented. This is beneficial to the safety of the occupants of the passenger cabin. The structure according to the invention thus exhibits improved accident behavior.

In particular, the function of the carrier element is that of holding off accident-related loads, i.e. impact forces or impact energies, at least to some extent, from the front wall and to divert said loads to the structures of the structure arranged behind the carrier element in the longitudinal direction of the vehicle. Since the carrier element overlaps the vehicle pillars at least toward the front, accident-related loads can advantageously be introduced into the vehicle pillars.

Preferably, lateral side sills, adjoining the vehicle pillars toward the bottom in the vertical direction of the vehicle, extending at least substantially in the longitudinal direction of the vehicle, are at least to some extent overlapped toward the front by the carrier element in the longitudinal direction of the vehicle. The accident-related loads can thus also be diverted by means of the carrier element to the side sills and by means of said side sills directed around the passenger cabin. As a result, the risk of unwanted damage to the passenger cabin can be kept particularly low.

The carrier element of the structure according to the invention can absorb and support accident-related loads since the carrier element is arranged in front of the front wall in the longitudinal direction of the vehicle. The carrier element can also function as a sacrificial component by deforming and/or collapsing due to energy absorption in case of the accident-related application of force. As a result, it is possible to convert the impact energy at least to some extent to deformation energy, reduce said impact energy and keep it away from the passenger cabin and thus the occupants of the motor vehicle. The front wall can thus withstand the accident-related application of force without unwanted damage.

In a particularly advantageous embodiment of the invention, the carrier element is made at least substantially of a fiber-reinforced plastic. As a result, the carrier element has a particularly high rigidity and/or strength. This is beneficial to the advantageous accident behavior of the structure according to the invention. Particularly, it is possible to adequately adjust the carrier element to loads occurring particularly during accident-related application of force and to design its form and/or wall thickness accordingly. It is further advantageous that the weight of the carrier element and thus of the entire structure can be kept particularly low. The high rigidity is advantageous for a very high overall rigidity of the structure, resulting in very favorable driving dynamics properties of the motor vehicle.

The fibers of the fiber-reinforced plastic embedded at least to some extent in the plastic of the carrier element can be fiberglass, aramid fibers, carbon fibers and/or other fibers with which the plastic of the carrier element is reinforced.

Preferably, the carrier element made of fiber-reinforced plastic is produced by means of a resin transfer molding (RTM) method, also called transfer molding. The carrier element can thus be produced time- and cost-effectively and adequately. The plastic of the carrier element is, e.g., a thermoset or an elastomer.

The carrier element made of fiber-reinforced plastic can be formed from one or more fabric layers, particularly fiber mats. The fabric layers or fiber mats can be pre-formed fabric layers or fiber mats, which are called preforms and which are provided with the plastic. For example, the plurality of fabric layers or fiber mats are arranged, connected to each other and formed with mutual overlapping in appropriate overlap regions. The fabric layer or layers are provided with the plastic which is the matrix material for receiving the fibers. As a result, the carrier element can be designed in one piece as a particularly rigid, strong and light fiber-plastic composite component. For reasons of simplifications, only the term fiber mat or fiber mats will be used in the following. It is understood that this can also denote fabric layers.

For the adequate and load-adjusted design of the carrier element, e.g., at least two of the fiber mats, from which the carrier element is produced, have thicknesses which differ from one another. As a result, the carrier element can have different wall thicknesses in at least two regions and thus correspondingly different properties.

Alternatively or additionally, in a first portion, the carrier element can have a first wall thickness which is greater than an at least second wall thickness in a second portion adjoining the first portion of the carrier element, wherein the first greater wall thickness is formed by the plastic of the carrier element. In other words, the carrier element is thickened in the first portion by means of the plastic, as compared to the second portion, and designed suitably adequate.

Alternatively or additionally, it is possible that the greater first wall thickness is formed in the first portion such that a greater number of fiber mat layers are provided in the first portion than in the second portion. For example, a first fiber mat is provided in the first portion and in the second portion, wherein in the first portion, at least one further fiber mat is additionally arranged, overlapping with the first fiber mat.

Such a plurality of fiber mat layers is also depicted in the overlap region, in which the fiber mats, of which the carrier element is made, mutually overlap. In the overlap region, the carrier element has a greater wall thickness than in at least one adjoining further region with no overlap. For example, the overlap region or—if a plurality of overlap regions are provided—the overlap regions can be arranged such that the structure according to the invention is provided with an advantageous and load-adjusted accident behavior.

It is further possible that the fiber mats, fabric layers or fiber mat layers differ from one another with regard to their composition, structure and/or with regard to their respective fiber direction. As a result, the fiber mats or fabric layers can be designed adequately and functionally adjusted with regard to their load-bearing and load-diverting capabilities because, depending on structure and or fiber direction, load paths can be created for absorbing and diverting particularly accident-related loads.

Furthermore, the fiber mat or fabric layer can be aligned with regard to its fiber direction and/or adequately designed with regard to its composition or structure. As a result, load paths for absorbing and diverting loads can be aligned functionally adjusted since the direction of the load paths and thus the load-bearing capability depends particularly on the fiber direction and/or the structure.

In a further advantageous embodiment, the front wall is at least predominantly overlapped toward the front by the carrier element in the longitudinal direction of the vehicle.

The carrier element is thus a second wall element in addition to the front wall, with which the front wall can be protected in case of an accident-related application of force on the motor vehicle.

Preferably, the carrier element is also supported, particularly through bypassing the front wall, in the longitudinal direction of the vehicle by a vehicle floor of the structure according to the invention. Thus, an advantageous load path is formed, with which the accident-related loads can be diverted into the vehicle floor—without being transmitted through the front wall—and thus kept away from the front wall. This results in a particularly favorable accident behavior of the structure according to the invention.

In a further advantageous embodiment of the invention, the carrier element is supported at least in a first portion by the front wall and in at least a second portion by the vehicle pillars. In other words, the carrier element is in support contact with the vehicle pillars, and therefore an advantageous support and diverting of the accident-related loads to the vehicle pillars is realized.

In a further advantageous embodiment, the front wall is provided with a front wall cross member, with which the carrier element is supported. The front wall cross member extends in the transverse direction of the vehicle and is arranged in the vertical direction of the vehicle in an upper region of the front wall or above said front wall. Due to the support of the carrier element by the front wall cross member, the accident-related loads can be also diverted from the carrier element to the front wall cross member.

Preferably, the front wall cross member is attached to the lateral vehicle pillars. The accident-related loads can thus be further diverted from the front wall cross member into the vehicle pillars and kept away from the passenger cabin.

In a further advantageous embodiment of the invention, the carrier element overlaps at least sections, particularly at least predominantly, of the front wall cross member toward the front in the longitudinal direction of the vehicle. As a result, the carrier element can initially absorb the accident-related loads and divert said loads specifically to the front wall cross member positioned behind the carrier element in the longitudinal direction of the vehicle.

Advantageously, the front wall cross member is at least substantially made of a fiber-reinforced plastic, thus having high rigidity, strength and low weight.

In a further advantageous embodiment, at least one gap is formed between the front wall and the carrier element, in which a bridging element supported by the front wall and the carrier element is arranged. As a result, targeted absorption and diverting of accident-related forces can be achieved, which is advantageous for the protection of the front wall. This is particularly the case if a support element on a rear side of the front wall, which is facing away from the carrier element and the bridging element and which is facing the passenger cabin, is supported by both the front wall and at least one structural component arranged in the longitudinal direction of the vehicle behind the front wall. As a result, loads introduced to the front wall by means of the bridging element can be directly diverted from the front wall and introduced into the structural component arranged behind the front wall. This provides a very advantageous load path. The structural component, for example, can be a tunnel element of the vehicle floor.

For adequate and local strengthening of the carrier element, it is provided with at least one reinforcement element. As a result, particularly the mechanical properties of the carrier element can be adequately and locally adjusted to the occurring loads.

Preferably, the bridging element and/or the reinforcement element are at least substantially made of a metallic material. The bridging element and/or the reinforcement element can be made from a steel, aluminum or aluminum alloy, or other light metal, particularly another light metal alloy. The bridging element and/or the reinforcement element can thus have particularly advantageous ductility and/or strength which are advantageous for the accident behavior of the carrier element and thus the structure according to the invention. A high ductility of the reinforcement element and/or the bridging element contributes to the efficient conversion of the accident-related loads to deformation energy. A particularly high strength results in high structural integrity of the carrier element, so the passenger cabin can be advantageously protected.

The bridging element and/or the reinforcement element can be designed as an extruded profile with at least one chamber. They can thus be produced time- and cost-effectively and have advantageous mechanical properties.

In a further advantageous embodiment, the bridging element and/or the reinforcement element has at least one fastener for fastening a front module of the vehicle and/or another attachment part to the structure. The fastener, for example, can be a screw boss and/or a screw-in opening, so the possibly metallic front module or the possibly metallic attachment part can be bolted tightly to the carrier element and thus be connected to the carrier element.

If the carrier element is made at least substantially of a fiber-reinforced plastic, the reinforcement element and/or the bridging element are preferably made of a metallic material. Thus, the fastener is also made of a metallic material. This allows for a strong and corrosion-preventing connection of the front module and/or the attachment with the carrier element.

The front module, for example, has an auxiliary member for holding a drive unit of the motor vehicle and/or an ancillary unit. The drive unit, for example, is at least one electric motor by which the motor vehicle can be powered.

In a further particularly advantageous embodiment of the invention, at least one support element for a spring and/or damping element of a chassis of the motor vehicle is provided. The support element supports and connects the spring and/or damping element to the structure, so the support element can absorb and support forces from the spring and/or damping element. The support element is supported, particularly in the longitudinal direction of the vehicle, by the carrier element. Advantageously, the support of the support element by the carrier element has a great, particularly extensive, extension. As a result, the spring and/or damping element are solidly and rigidly supported by the structure. This contributes to very favorable driving dynamics of the motor vehicle.

If the carrier element is adhesively bonded with the front wall, the vehicle pillars and/or the front wall cross member, the weight of the structure is kept low. It also realizes a particularly tight and corrosion-preventing connection.

In a further advantageous embodiment of the invention, the front wall, the support element, the vehicle pillars and/or the side sills are made at least substantially of a fiber-reinforced plastic. As a result, the weight of the structure and thus the motor vehicle is kept low, and the motor vehicle can be powered with a low energy requirement. Furthermore, this ensures a high rigidity of the structure which is associated with advantageous driving dynamics properties of the motor vehicle.

Preferably, the structure according to the invention is designed as a self-supporting vehicle body for a passenger car.

The invention also relates to a method for producing a structure, particularly a structure according to the invention, for a motor vehicle. The structure comprises a front wall, delimiting the passenger cabin of the motor vehicle toward the front, and which extends between lateral vehicle pillars of the structure.

According to the invention, a carrier element extending in the longitudinal direction of the vehicle is supported by a front side of the front wall and at least sections are arranged overlapping the vehicle pillars. Advantageous embodiments of the structure according to the invention must be considered to be advantageous embodiments of the method according to the invention, and vice versa.

The method according to the invention allows for the realization of an improved accident behavior of the structure since the carrier element, due to its arrangement and support, can protect the front wall against unwanted damage. Unwanted intrusions into the passenger cabin can thus be prevented, resulting in great safety for the occupants of the motor vehicle.

Within the framework of the method according to the invention, the vehicle pillars and the side sills, adjoining the vehicle pillars toward the bottom in the vertical direction of the vehicle, and the front wall with the front wall cross member are initially produced and joined with one another. In addition, further components of the structure can be produced and joined. Then, the carrier element is arranged in front of the front wall and joined with the front wall and, preferably, the vehicle pillars, the front wall cross member, and the side sills, and appropriately supported by said front wall, so that the front wall, the vehicle pillars, the front wall cross member, and the side sills are overlapped toward the front by the carrier element.

As a result, the carrier element initially absorbs the accident-related loads in case of a frontal impact collision of the motor vehicle with a barrier and specifically diverts said loads to structures arranged behind the carrier element, such as the vehicle pillars, the front wall cross member, and the side sills, and at least predominantly keeps said loads away from the front wall for its protection.

The carrier element is joined with the front wall and possibly with the front wall cross member, the vehicle pillars, and the side sills during assembly of the structure. This allows for a time- and cost-effective production.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
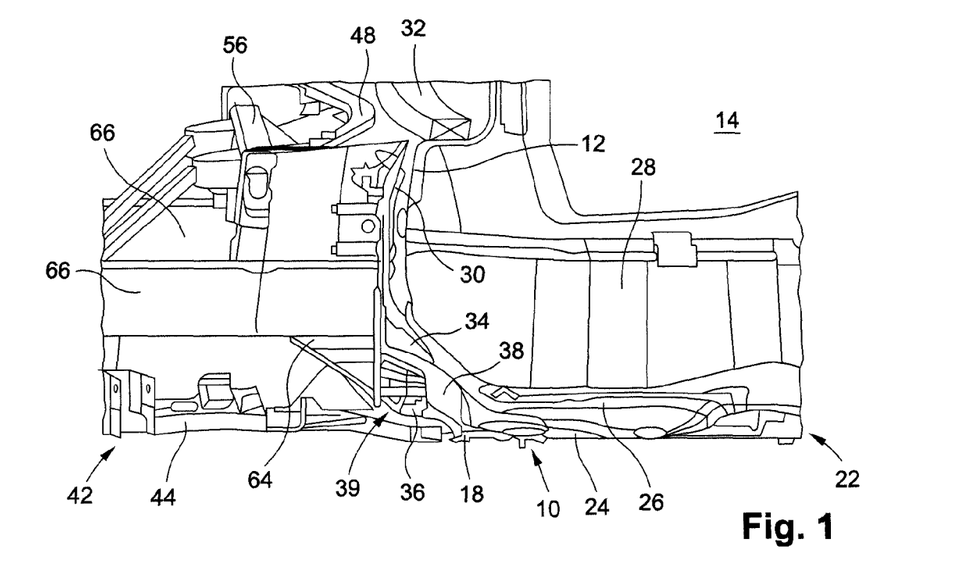
FIG. 1 illustrates in a schematic view parts of a longitudinal section of a structure for a passenger car with an attached front module of the passenger car.
Figure 2:
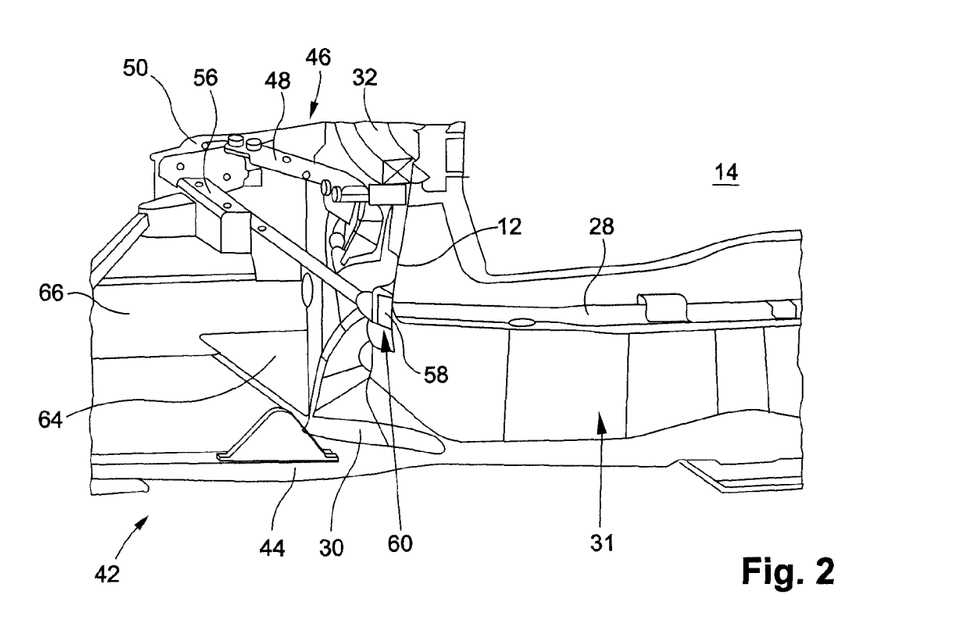
FIG. 2 illustrates in a further schematic view parts of a longitudinal section of the structure with the front module according to FIG. 1.

FIG. 1 shows a structure 10 for a passenger car. As can be seen in conjunction with FIGS. 2 to 7, the structure 10 includes a front wall 12 delimiting a passenger cabin (cell) 14 of the passenger car toward the front in the longitudinal direction of the vehicle. The structure 10 also includes lateral vehicle pillars (columns) 16 which are spaced apart from one another in the transverse direction of the vehicle and which, in the present embodiment, are the so-called A-pillars of the structure 10. The front wall 12 extends between the vehicle pillars 16 in the transverse direction of the vehicle.

Side sills 18 of the structure 10 adjoin the vehicle pillars 16 toward the bottom in the vertical direction of the vehicle. The vehicle pillars 16 are at least to some extent integral with the side sills 18, so the respective vehicle pillar 16 with the corresponding side sill 18 can, as a whole, also be called side frame element. The structure 10 is a self-supporting vehicle body for a passenger car.

The side frame elements which include the vehicle pillars 16 and the side sills 18 have a side frame inner part and a side frame outer part. The side frame outer part is formed in a shell construction from a fiber-reinforced plastic. The side frame inner part includes a braided profile 20 with a foam core braided with fibers. In addition, the side frame inner part includes formed fabric layers or fiber mats, wherein the braided profile and the formed fiber mats (preforms) are provided with a plastic, so the side frame inner part is made at least substantially of a fiber-reinforced plastic with the braided foam core.

The structure 10 further includes a vehicle floor 22 with a lower floor shell 24 and upper floor shells 26 which are arranged on the lower floor shell 24 forming at least one gap each. The lower floor shell 24 and upper floor shells 26 are also made at least substantially of a fiber-reinforced plastic.

The lower floor shell 24 forms a central tunnel 28 of the structure 10. The central tunnel 28 provides a receiving space 31 for receiving at least one electric storage device, particularly a high-voltage storage device. By means of the electric storage device, at least one electric motor of the passenger car can be provided with electric current, so the electric motor can power the passenger car.

For example, the passenger car is designed as a hybrid car or an electric vehicle and can thus be powered with low emissions or even emission-free. The design of the corresponding components of the structure 10 made at least substantially of a fiber-reinforced plastic keeps the weight of the passenger car low, so it can be powered with a very low energy requirement. Moreover, this results in a very high rigidity of the structure 10 and thus to particularly favorable driving dynamics properties.

In the longitudinal direction of the vehicle, a carrier element 30, designed separately from the front wall 12, is arranged in front of the front wall 12. The carrier element is supported by a front side 33 of the front wall 12, extending in the transverse direction of the vehicle and extensively overlapping the front wall 12, the vehicle pillars 16 and the side sills 18 (side frame elements) toward the front. The carrier element 30 is also supported by the vehicle pillars 16 and the side sills 18.

The carrier element 30 is made of a carbon fiber-reinforced plastic and preferably produced using an RTM method. Thus, the carrier element 30 has high rigidity and strength and low weight. This is beneficial to the rigidity of the entire structure 10 and the driving dynamics properties of the passenger car. Moreover, the carrier element 30 can thus be adequately designed with regard to its accident behavior.

The front wall 12 is provided with a front wall cross member 32 which, by way of the carrier element 30, is, at least in regions, overlapped toward the front in the longitudinal direction of the vehicle and which supports the carrier element 30. The carrier element 30 is adhesively bonded with the front wall cross member 32, the front wall 12, the vehicle pillars 16, and the side sills 18.

In the event of a frontal impact collision of the passenger car with a barrier, the carrier element 30 can initially absorb accident-related loads. From the carrier element 30, the accident-related loads are at least predominantly diverted along advantageous load paths specifically into structures arranged behind the carrier element 30 in the longitudinal direction of the vehicle, such as the front wall cross member 32, the vehicle pillars 16, and the side sills 18, and at least predominantly kept away from the front wall 12. The front wall 12 can thus be protected from unwanted damage. In addition, unwanted intrusions into the passenger cabin 14 can be prevented.

In the region of the side sills 18, lateral support carrier elements 34 are provided at least to some extent between the lower floor shell 24 and the upper floor shell 26. The support carrier elements 34, bypassing the front wall 12, are directly supported both by the carrier element 30 and the lower floor shell 24 and/or the upper floor shell 26. As a result, accident-related loads can be directly diverted from the carrier element 30 through the support carrier elements 34 to the vehicle floor 22, while bypassing the front wall 12. The support carrier elements 34 are also supported by the side sills 18, so the accident-related loads can also be diverted into the side sills 18.

For illustrating a particularly advantageous transmission of the accident-related loads from the carrier element 30 to the vehicle floor 22, lateral, extruded aluminum profiles 36 are provided. The profiles 36 are supported directly by the carrier element 30 and, each by way of a shoe 38, by the support carrier element 34. The shoes 38, for example, are designed as sheet metal components. The extruded aluminum profiles 36 have a multi-chamber profile 39, so they can be deformed due to energy absorption in case of accident-related application of force and contribute to the conversion of accident-related loads to deformation energy.

Figure 3:
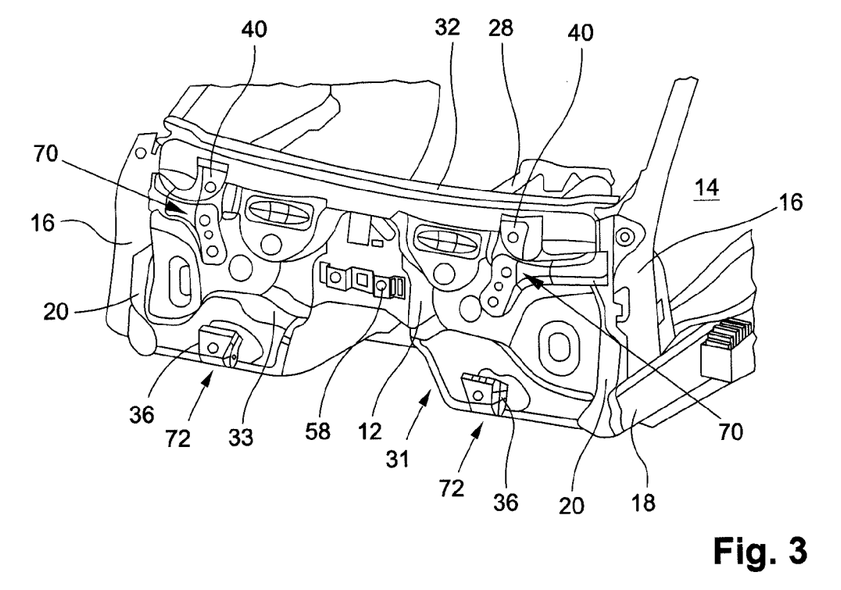
FIG. 3 illustrates in a schematic and perspective front view parts of the structure according to FIGS. 1 and 2.
Figure 4:
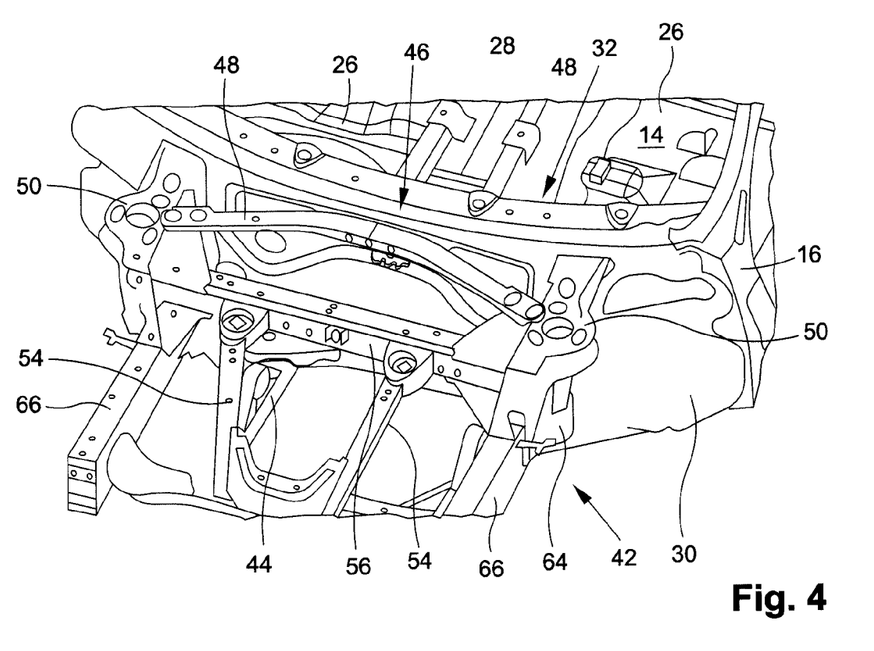
FIG. 4 illustrates in a schematic perspective view parts of the structure with the front module according to FIGS. 1 and 2.
Figure 5:
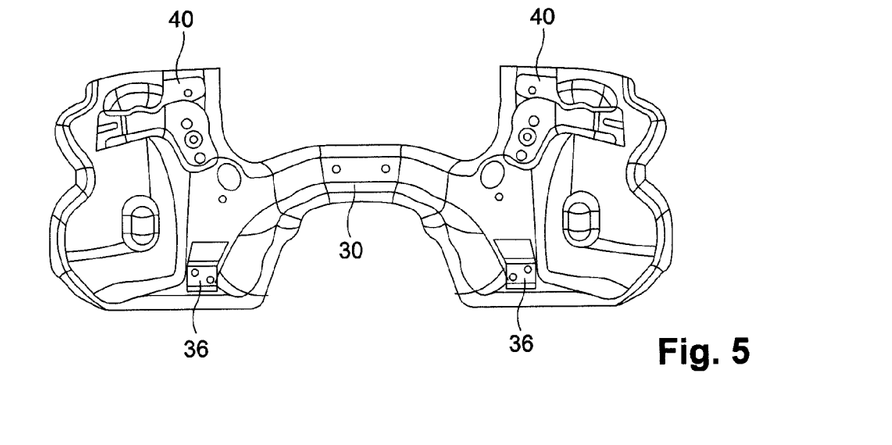
FIG. 5 is a schematic rear view of a carrier element of the structure according to FIGS. 1 to 4.
Figure 6:
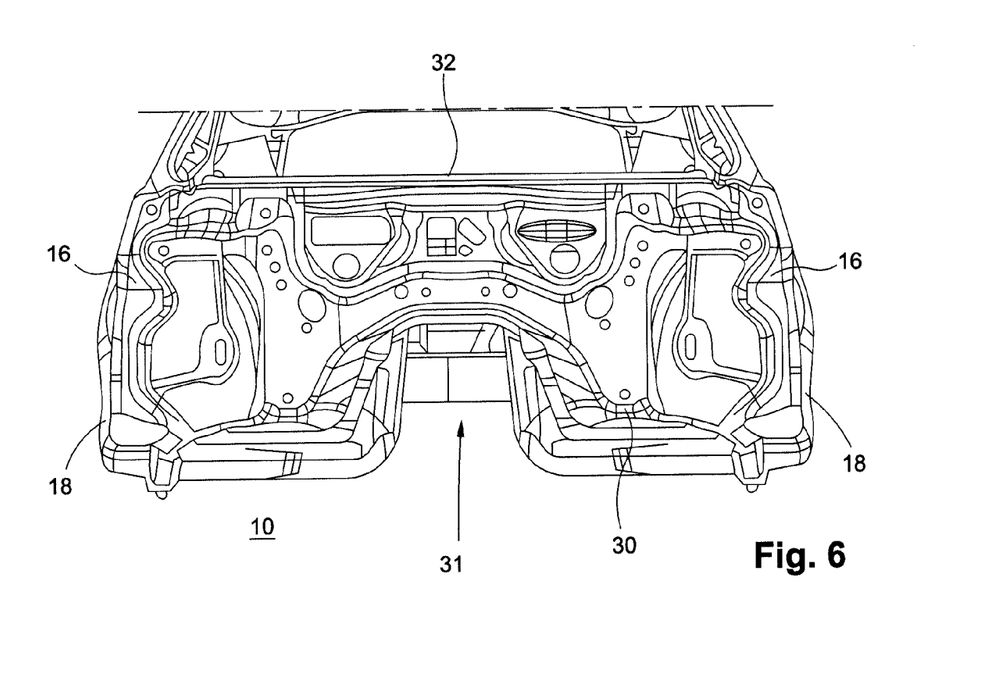
FIG. 6 illustrates in a further schematic front view parts of the structure according to FIG. 3.
Figure 7:
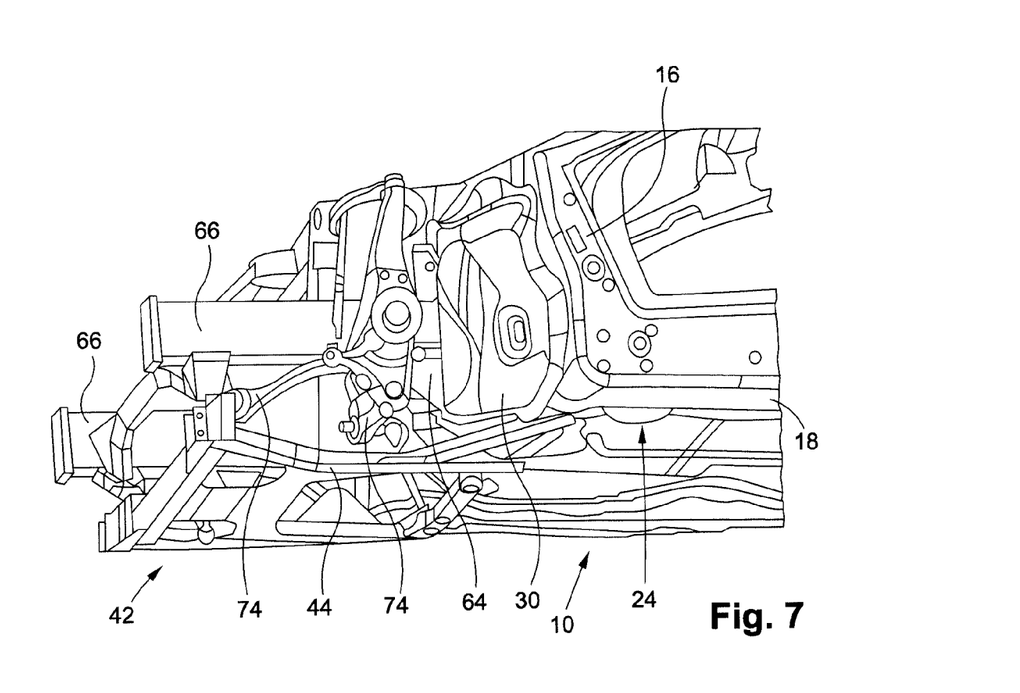
FIG. 7 illustrates in a schematic and perspective view from below parts of the structure with the front module according to FIGS. 1 and 2.

The extruded aluminum profiles 36 are adhesively bonded with the corresponding shoes 38 and the carrier element 30. Moreover, reinforcement elements 40 are provided which are adhesively bonded with the carrier element 30. The reinforcement elements 40 are made of steel and, due to their advantageous ductility, also contribute to the conversion of the accident-related loads to deformation energy and a high structural integrity of the passenger cabin 14. Furthermore, the reinforcement elements 40 divert the accident-related loads in the transverse direction of the vehicle outward in the direction of the side frame elements and to introduce said loads into the side frame elements and the front wall cross member 32. FIG. 3 shows the metallic parts 36, 36, 40, 40 of the carrier element 30 joined to the front wall 12 with the plastic parts of the carrier element 30 removed. Likewise, FIG. 5 shows both the metallic and plastic parts of the carrier element 30.

The reinforcement elements 40 and the extruded aluminum profiles 36 are scalable with regard to their wall thicknesses and/or their material qualities and can thus be adequately designed with regard to their accident behavior, so the entire structure 10 can be produced load-oriented and adequately with regard to its accident behavior.

A front module 42 of the passenger car is connected to the structure 10. The front module 42 has an auxiliary member 44 for holding the electric motor for powering the passenger car. Furthermore, steering elements 74 of a chassis, for example, and by means of said steering elements 74, wheels of the passenger car can be linked to the auxiliary member 44.

The front module 42 also includes a strut arrangement 46 with strut braces 48 which are connected to the support elements 50 of the front module 42 and the front wall cross member 32.

The front module 42 is connected to and supported by the structure 10 by way of further struts 54. The struts 54 are connected to a cross member element 56 of the front module 42 and to the carrier element 30. For the connection to the carrier element 30, a bridging element 58 is provided which is supported by the front wall 12 and the carrier element 30 and made of a metallic material, such as steel. As a result, the struts 54 can be bolted tightly to the bridging element 58 by screwing appropriate screws into the bridging element 58. The bridging element 58 is arranged in a gap 60 between the carrier element 30 and the front wall 12.

For connecting the front module 42 to the carrier element 30, the reinforcement elements 40 of the carrier element 30 provide, in the present embodiment, six screw-in openings 70, extending at least substantially in the longitudinal direction of the vehicle (x-direction). The reinforcement elements 40 made of a steel thus allow for a particularly tight connection of the front module 42 with the carrier element 30 and thus with the structure 10. Furthermore, the extruded aluminum profiles 36 provide further screw-in openings 72 for screwing on the auxiliary member 44 and corner elements 64. The corner elements 64 are supported by longitudinal carrier elements 66 of the front module 42 and the carrier element 30 and extend in corner regions formed by the longitudinal carrier elements 66 and the carrier element 30 around the corners.

Only a very small number of components have to be joined with one another in the structure 10 since the carrier element 30 has a high integration of functions and assumes reinforcement or bracing and connecting functions. As illustrated in FIGS. 1 to 7, the carrier element 30 is joined in the longitudinal direction of the vehicle from the front during the course of the assembly, instead of during the course of the shell construction, temporally after the side frame elements are produced and joined with the front wall cross member 32 and the front wall 12 and can thus planarly overlap the front wall 12, the front wall cross member 32, and the side frame elements.

The support elements 50 support spring and/or damping elements of the chassis of the passenger car. As illustrated particularly in FIG. 4, the support elements 50 are supported in the longitudinal direction of the vehicle particularly massively on the carrier element 30. Thus, the spring and/or damping elements can be solidly and rigidly supported by means of the front module 42 in the structure 10, which allows for a particularly high driving dynamics rigidity of the passenger car. The support elements 50 can also be made at least substantially of a fiber-reinforced plastic which is beneficial to the high rigidity and the low weight of the passenger car.

By means of the reinforcement elements 40, further fastening elements can each be formed for fastening at least one covering element, particularly a fender lining, of the passenger car. Alternatively, connecting elements separately designed from the reinforcement elements 40 can be fastened, particularly adhesively bonded, to the carrier element 30 and used for connecting the covering element to the carrier element 30.

LIST OF REFERENCE SIGNS

10 Structure
12 Front wall
14 Passenger cabin
16 Vehicle pillar
18 Side sill
20 Braided profile
22 Vehicle floor
24 Lower floor shell
26 Upper floor shell
28 Central tunnel
30 Carrier element
31 Receiving space
32 Front wall cross member
33 Front side
34 Support carrier element
36 Extruded aluminum profile
38 Shoe
39 Multi-chamber profile
40 Reinforcement element
42 Front module
44 Auxiliary member
46 Strut arrangement
48 Strut brace
50 Support element
54 Strut
56 Cross member element
58 Bridging element
60 Gap
64 Corner element
66 Longitudinal carrier element
70 Screw-in openings
72 further screw-in openings
74 Steering element The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A structure for a motor vehicle, comprising:
   a front wall delimiting toward a front in a longitudinal direction a passenger cabin of the motor vehicle;
   lateral vehicle pillars of the motor vehicle, the front wall extending between the lateral vehicle pillars;
   a carrier element extending in a transverse direction of the motor vehicle, the carrier element being supported by a front side of the front wall and, at least to some extent, overlapping the lateral vehicle pillars; and
   at least one support element configured for at least one of a spring and damping element of a chassis of the motor vehicle, wherein the support element is supported by the carrier element in the longitudinal direction of the motor vehicle.

2. The structure according to claim 1, wherein
at least one of the front wall, the support element and the lateral vehicle pillars are made at least substantially of a fiber-reinforced plastic.

3. A structure for a motor vehicle, comprising:
a front wall delimiting toward a front in a longitudinal direction a passenger cabin of the motor vehicle;
lateral vehicle pillars of the motor vehicle, the front wall extending between the lateral vehicle pillars; and
a carrier element extending in a transverse direction of the motor vehicle, the carrier element being supported by a front side of the front wall and, at least to some extent, overlapping the lateral vehicle pillars,
wherein the carrier element is supported at a first portion thereof by the front wall and at a second portion thereof by the lateral vehicle pillars,
wherein the front wall includes a front wall cross member, and
wherein the front wall cross member supports the carrier element.

4. The structure according to claim 3, wherein
the carrier element overlaps, at least in sections, the front wall cross member towards a front in the longitudinal direction of the motor vehicle.

5. The structure according to claim 1, wherein the carrier element is adhesively bonded with at least one of the front wall, the lateral vehicle pillars, and the front wall cross member.

6. The structure according to claim 3, wherein
the carrier element is at least substantially made of a fiber-reinforced plastic.

7. The structure according to claim 6, wherein
the carrier element at least substantially overlaps the front side of the front wall.

8. The structure according to claim 3, further comprising:
a vehicle floor, wherein
the carrier element is supported by the vehicle floor.

9. The structure according to claim 8, wherein
the vehicle floor includes a tunnel element extending in the longitudinal direction of the motor vehicle, and
the carrier element is supported by the tunnel element bypassing the front wall.

10. The structure according to claim 3, further comprising:
at least one gap formed between the front wall and the carrier element; and
a bridging element arranged in the gap, the bridging element being supported by the front wall and the carrier element.

11. The structure according to claim 10, wherein
the carrier element is provided with at least one reinforcement element that reinforces the carrier element.

12. The structure according to claim 11, wherein
at least one of the bridging element and the reinforcement element is made at least substantially of a metallic material.

13. The structure according to claim 12, wherein
at least one of the bridging element and the reinforcement element includes at least one fastener by which a front module of the motor vehicle is fastenable to the structure.

14. A method for producing a structure for a motor vehicle, the method comprising the acts of:
providing a front wall delimiting a passenger cabin toward a front in the longitudinal direction of the motor vehicle, the front wall extending between lateral vehicle pillars that are provided;
arranging a carrier element so as to overlap the lateral vehicle pillars at least in sections and to be supported by a front side of the front wall, the carrier element extending in a transverse direction of the motor vehicle;
supporting the carrier element at a first portion thereof by the front wall and at a second portion thereof by the lateral vehicle pillars, wherein the front wall includes a front wall cross member; and
supporting the carrier element with the front wall cross member.

15. The method according to claim 14, further comprising the act of adhesively bonding the carrier element with at least one of the front wall, the lateral vehicle pillars and a front wall cross member configured to support the carrier element.

16. The method according to claim 14, further comprising the act of:
forming the carrier element at least substantially of a fiber-reinforced plastic.

17. The method according to claim 16, wherein the arranging of the carrier element is carried out so that the carrier element at least substantially overlaps the front side of the front wall.

18. The method according to claim 17, further comprising the act of:
supporting the carrier element by a tunnel element of a vehicle floor, the tunnel element extending in a longitudinal direction of the motor vehicle.

* * * * *